United States Patent Office 2,925,355
Patented Feb. 16, 1960

2,925,355

METHOD OF MAKING AN OFFSET BLANKET

Edward D. Hill, Cleveland, Ohio

No Drawing. Application April 13, 1954
Serial No. 422,978

3 Claims. (Cl. 117—35.6)

In some printing usages, an ink-receptive organic surface is employed to receive an ink impression and transfer it to paper. Thus for instance, a transfer member or offset blanket is the important agent in this form of printing. A high precision action is theoretically imposed upon such a surface, and the ideal has not been attained, but merely a working approximation. In halftone reproduction a precise gradated transfer of individual minute dots imposes a severe precision. The material of such surfaces heretofore has been rubber, but its ink-attractiveness is deficient in comparison with what is actually required for desirable high grade work as involved in the transfer of gradated minute dot form ink impressions onto the final printed sheet. Furthermore, rubber has the particularly serious drawback of changing in the vulcanization procedure, such that it cannot form a satisfactory smooth surface unless it is finally trued by a face-grinding operation. Moreover, rubber blankets have the very serious drawback of being susceptible to action of some of the modern type inks, and with these the rubber tends to progressively change. I have now found that a superior ink-transfer surface can be attained, and having further advantages that it can be made up in forms involving either more or less refinement as dictated by any particular printing work at hand. Furthermore, this improved transfer means is relatively simple and not requiring over-technical knowledge and skill. Other objects and advantages will appear from the following description.

To the accomplishment of the foregoing and related ends, said invention, then, comprises the features hereinafter fully described and particularly pointed out in the claims, the following description setting forth in detail certain illustrative embodiments of the invention, these being indicative, however, of but a few of the various ways in which the principle of the invention may be employed.

In general, in accordance with the invention, a composition is prepared, including a polyvinyl chloride-containing resin and adjuvant material, and this is made into the desired ink-transfer or blanket form. The thickness of such member or blanket may be as desired in any given case, taking account of the size of operating surface to be involved, and the manner of mounting of the blanket, as readily understood in the art.

For some usages, the transfer member or blanket can be formed as a suitably thick sheet, and its inherent strength both in compressive and tensile sense is adequate for the not-excessive duty contemplated. More usually however, it is desirable to include a strengthening or reinforcing element or foundation fabric. This may be in considerable range, depending upon particular duty conditions contemplated, and for instance may be canvas, nylon mesh, wire mesh, or in general any reinforce fabric. Thus, a transfer sheet may be made up in thickness as desired, for instance the common range of around $\frac{2}{16}$–$\frac{4}{16}$ in.

The composition is made up of polyvinyl resin (chloride, acetate, vinylidene, and copolymers thereof) in amount for instance of 100 parts, and 50–500 parts of adjuvant, this being in some respects in the nature of a plasticizer. Thus, the adjuvant preferably is a polyvinyl cyanide copolymer, most desirably of such low polymerization as to be applicable in liquid form. One commercial material which can be used to furnish polyvinyl cyanide copolymer is for instance "Hycar" 1012X41 which is a low molecular weight liquid butadiene-acrylonitrile polymer. In some cases which are not too exacting, a sufficiently satisfactory result may be had with a polyester plasticizer having a rather high viscosity, for instance 15,000 cps. at 20° C., and in some cases also high boiling phthalates, as dioctyl phthalate, dibutyl phthalate, dibutoxy ethyl phthalate, diethoxy phthalate, dihexyl phthalate, dicarbitol phthalate, and other liquid miscible agents as tricresyl phosphate, dibutyl sebacate, dihexoate, etc., may be employed. The polyvinyl resin is as indicated, polyvinyl chloride, and may include polyvinyl acetate and copolymers, vinylidene, etc. Preferably, though not necessarily in all cases, the polyvinyl resin may be initially in raw material form of finely divided solid, e.g., around 300 mesh. And with this is mixed the adjuvant, polyvinyl cyanide copolymer or other as afore-indicated, and the mixing should be performed at 200° to 250° F. since the viscosity of the cyanide is such that dispersing the finely powdered resin without milling would be difficult. Otherwise, the cold-mixed material may be stocked for a time until it is to be used in final formation of the transfer member or blanket. The resin is not affected up to and including 250° F., but above 260° F. a thickening occurs and at 295–300° F. there is a blending into a homogeneous mass.

The viscosity of the polyvinyl cyanide copolymer is such that an amount enough to fill a half pint can will adhere to a paddle 2 inches wide inserted 6 inches in the liquid at 70° F.; whereas a coating comparable to that of good flowing paint is attained at 250° F. on the same paddle.

A desirable thickness of an offset blanket being 0.015 to 0.020 inch, this phenomenon can be employed to obtain an extremely accurate overall thickness depending on a thermostatically controlled heated container.

A particularly advantageous feature in the present invention is that by control of temperature in the heating operation, an accurate control of the thickness of the blanket product can be had. Thus, with the temperature in the range of 280–400° F., more or less viscosity may be realized, and correspondingly greater or lesser thickness of the composition, particularly in the sense of its coating on or with a fabric reinforce.

It is possible to make a relatively firm surface blanket, or on the other hand a soft surface blanket, and the generally desired quality of "tack" is readily attainable. As known, "tack" may be availed of for the direct ink-transferring area while for a non-printing area the application of talc or soapstone thereto prevents tendency for paper to adhere.

A particular advantage for the constructing of transfer blankets in accordance with the present invention is that heating effects on the composition can be controlled to avoid discoloration, the addition of 2–10 percent of a heating stabilizer, such as basic lead stearate, basic lead carbonate, tin ricinoleate, etc., affording such results; and furthermore, in cases where a more permanent type of operating blanket is desired rather than a somewhat shorter-life service, the present composition has the advantage that by including 2–10 parts of sulphur, and 2–10 parts of zinc oxide, titanium dioxide or the like, and prolonging the heating to around 30 minutes, more or less depending upon the thickness of the blanket, the product is vulcanized to a high degree of permanency, and this form of blanket allows use where heat-set inks are used and the blanket-carrying cylinder is necessarily heated. Extreme versatility in meeting varied working conditions is thus a particular characteristic of the present construction.

As afore-indicated, an especially smooth ink-transfer surface is realized in the construction here involved. And for this, the chief requisite is that the transfer member or blanket in its process of making, have its face maintained free from contact with surfaces which would result in destroying its otherwise attainable smoothness. In some cases it is particularly satisfactory to lay out the structure on a flat basis. The foundation fabric is supplied with the polyvinyl composition as a coating, the thickness being determined as above-indicated by the viscosity and by the temperature factor therefor, and the application of the composition may be accomplished by roller-coating the fabric or by running the fabric over a roller which dips into a pan of the composition, or for coating on both sides the fabric can be run through the composition in a pan-container. For small units the composition can be applied by manual operation with a suitable scraper-like tool. Whether with or without fabric reinforcement, the unit is laid out on a metal support and heat is applied to bring about the completion of the action in the polymer composition. In general, bringing the temperature up to the desired end point, 300° F., or the higher temperature for the particular material thickness, in the range up to 400° F., is sufficient without substantial maintaining of the temperature after the desired degree is reached.

In some cases instead of laying out the blanket on a level surface, the fabric reinforce may be mounted on a rotatable cylinder, and the composition may be applied thereto, the cylinder being rotated at moderate speed, thereby evening the surface to uniform smoothness and providing even thickness. Rotation rate of 5–150 r.p.m. for instance is satisfactory, depending upon the size of the cylinder. Where a vulcanizing agent has been included in the composition, as above-mentioned, the heating, whether on a level support or on a rotating cylinder, is to be continued to accomplish the desired vulcanization.

As an example: Polyvinyl chloride resin in a fineness of 300 mesh, 100 parts, and 50–500 parts of polyvinyl cyanide copolymer with butadiene (Hycar 1012X41) in liquid form, and 2–10 parts of basic lead carbonate are mixed together, all by weight. This material is spread out in uniform thickness on a level metal support which is brought up to a temperature of 300° F. After cooling down to moderate temperature, the blanket is removed from the support.

As another example: To the composition as made up in the foregoing example there is added 2–10 parts of sulphur and 2–10 parts of titanium dioxide per 100 parts of cyanide copolymer. This composition is spread out in uniform thickness on a support plate surface as foregoing, and is heated, the temperature being raised to 350° F. and maintained for 30 minutes, and after cooling, the blanket is removed from the support.

As another example: Canvas is coated with the composition as in either of the foregoing examples, and on a level support plate is subjected to the appropriate temperature, after which it is cooled and removed.

Other modes of applying the principle of the invention may be employed, change being made as regards the details described, provided the features stated in any of the following claims or the equivalent of such be employed.

I therefore particularly point out and distinctly claim as my invention:

1. A method of directly preparing an off-set blanket having a desired quality of tack and a uniform thickness without requiring any subsequent shaping step, comprising mixing at a temperature below about 250° F. about 100 parts by weight of a polyvinyl resin selected from the class consisting of polyvinyl chloride, copolymer of vinyl chloride with vinyl acetate, and copolymer of vinyl chloride with vinylidene chloride and 50 to 500 parts by weight of a low polymer liquid butadiene-acrylonitrile, heating the mixture from about 295° F. to 400° F. to convert it into a homogeneous mass, forming the mass in a blanket form, maintaining a face of the blanket free from defacement-contact, the properties of the mixture causing uniform thickness to result coextensively with the blanket area, and continuing the heating step to convert the mixture to a final set.

2. A method of directly preparing an off-set blanket having a desired quality of tack and a uniform thickness without requiring any subsequent shaping step, comprising mixing at a temperature below about 250° F. about 100 parts by weight of a finely divided solid polyvinyl resin selected from the class consisting of polyvinyl chloride, copolymer of vinyl chloride with vinyl acetate, and copolymer of vinyl chloride with vinylidene chloride and 50 to 500 parts by weight of a low polymer liquid butadiene-acrylonitrile, heating the mixture from about 295° F. to 400° F. to convert it into a homogeneous mass, applying the mass as a layer over a reinforcing fabric, maintaining a face of the layer free from defacement-contact, the properties of the mixture causing uniform thickness to result coextensively with the area of the layer, and continuing the heating step to convert the mixture to a final set.

3. A method of directly preparing an off-set blanket having the desired quality of tackiness and a uniform thickness without requiring any subsequent shaping step, comprising mixing at a temperature below about 250° F. about 100 parts by weight of a polyvinyl resin selected from the class consisting of polyvinyl chloride, a copolymer of vinyl chloride with vinyl acetate and copolymer of vinyl chloride with vinylidene chloride, 50 to 500 parts by weight of a low polymer liquid butadiene-acrylonitrile, and sufficient sulfur to vulcanize the resulting mixture, heating the mixture from about 295° F. to 400° F. to convert it into a homogeneous mass, forming the mass in a blanket form, maintaining a face of the blanket free from defacement-contact, the properties of the mixture causing uniform thickness to result coextensively with the blanket area, and continuing the heating step to convert the mixture to a final set.

References Cited in the file of this patent

UNITED STATES PATENTS

| | | |
|---|---|---|
| 2,181,478 | Fligor | Nov. 28, 1939 |
| 2,232,989 | Wooddell | Feb. 25, 1941 |
| 2,288,152 | Bjorksten | June 30, 1942 |
| 2,327,128 | Remfrew | Aug. 17, 1943 |
| 2,489,791 | Liles | Nov. 29, 1949 |
| 2,552,904 | Newberg | May 15, 1951 |
| 2,562,782 | Frost | July 31, 1951 |

OTHER REFERENCES

Sirota: "Organic Finishing," December 1950, vol. 11, No. 12, pp. 11–15.

"Handbook of Material Trade Names," Zimmerman and Lavine, 1953, pp. 283 and 284.